United States Patent
Castelli et al.

(10) Patent No.: US 10,424,101 B2
(45) Date of Patent: *Sep. 24, 2019

(54) SYSTEM AND METHOD FOR ENABLING MULTIPLE-STATE AVATARS

(71) Applicant: International Business Machines Corporation, Armonk, NY (US)

(72) Inventors: Vittorio Castelli, Croton on Hudson, NY (US); Rick A. Hamilton, II, Charlottesville, VA (US); Clifford A. Pickover, Yorktown Heights, NY (US); John J. Ritsko, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,045

(22) Filed: Apr. 25, 2016

(65) Prior Publication Data

US 2016/0239993 A1 Aug. 18, 2016

Related U.S. Application Data

(63) Continuation of application No. 12/174,985, filed on Jul. 17, 2008, now Pat. No. 9,324,173.

(51) Int. Cl.
*G06T 13/40* (2011.01)

(52) U.S. Cl.
CPC .................... *G06T 13/40* (2013.01)

(58) Field of Classification Search
CPC .......... G06T 13/40; G06F 3/011; G06F 3/014; G06F 2203/012; G06F 2300/6607;
(Continued)

(56) References Cited

U.S. PATENT DOCUMENTS 5,319,758 A    7/1994   Arai et al.
5,736,982 A * 4/1998   Suzuki .................... G06T 15/30
                                                        348/E7.083

(Continued)

FOREIGN PATENT DOCUMENTS

JP           10222692      8/1998
WO      2007086038      8/2007

OTHER PUBLICATIONS

Dr. John Robinson, et al., MVIP-II: A Protocol for Enabling Communication in Collaborative Virtual Environments, Association for Computing Machinery, Inc., 2003, pp. 155-160, 1-58113-644-7/03-0003.

(Continued)

*Primary Examiner* — Daniel F Hajnik
(74) *Attorney, Agent, or Firm* — Konrad Raynes Davda & Victor LLP; Janaki K. Davda

(57) ABSTRACT

A method for rendering a virtual world avatar of a computerized system is disclosed. The method comprises defining a plurality of receptor points located on the virtual world avatar, wherein the plurality of receptor points is associated with at least one object that moves between the plurality of receptor points based upon at least one predetermined trigger, changing a state of at least one of the plurality of receptor points from a first state to a second state based upon a measurable quantity and a predetermined threshold to update the associated at least one object, and in response to the measurable quantity no longer satisfying the predetermined threshold, reverting the state of the at least one of the plurality of receptor points from the second state back to the first state.

18 Claims, 2 Drawing Sheets

(58) Field of Classification Search
CPC .......... G06F 2300/6623; G06F 13/212; G06F 13/213; A63F 13/212; A63F 13/213; H04N 7/15–157; H04N 7/157; H04L 12/1813–1831

See application file for complete search history.

(56) References Cited

U.S. PATENT DOCUMENTS

| | | | |
|---|---|---|---|
| 5,852,672 A | 12/1998 | Lu | |
| 5,880,788 A * | 3/1999 | Bregler | G03B 31/02 345/473 |
| 6,069,632 A | 5/2000 | Mullaly et al. | |
| 6,088,698 A | 7/2000 | Lipkin | |
| 6,227,974 B1 | 5/2001 | Eilat et al. | |
| 6,332,163 B1 | 12/2001 | Bowman-Amuah | |
| 6,340,332 B1 * | 1/2002 | Rimoto | A63F 13/10 463/3 |
| 6,377,263 B1 | 4/2002 | Falacara et al. | |
| 6,421,047 B1 | 7/2002 | de Groot | |
| 6,522,333 B1 | 2/2003 | Hatlelid et al. | |
| 6,553,006 B1 | 4/2003 | Kalliokulju et al. | |
| 6,564,250 B1 | 5/2003 | Nguyen | |
| 6,572,662 B2 | 6/2003 | Manohar et al. | |
| 6,629,112 B1 | 9/2003 | Shank et al. | |
| 6,629,129 B1 | 9/2003 | Bookspan et al. | |
| 6,677,976 B2 | 1/2004 | Parker et al. | |
| 6,714,987 B1 | 3/2004 | Amin et al. | |
| 6,798,407 B1 | 9/2004 | Benman | |
| 6,907,395 B1 | 6/2005 | Hunt et al. | |
| 6,912,565 B1 | 6/2005 | Powers et al. | |
| 7,027,975 B1 | 4/2006 | Pazandak et al. | |
| 7,155,380 B2 | 12/2006 | Hunt et al. | |
| 7,155,680 B2 | 12/2006 | Akazawa et al. | |
| 7,240,067 B2 | 7/2007 | Timmons | |
| 7,269,632 B2 | 9/2007 | Edeker et al. | |
| 7,337,208 B2 | 2/2008 | Gall et al. | |
| 7,342,587 B2 | 3/2008 | Danzig et al. | |
| 7,412,422 B2 | 8/2008 | Shiloh | |
| 7,445,549 B1 * | 11/2008 | Best | A63F 13/10 463/30 |
| 7,564,476 B1 | 7/2009 | Coughlan et al. | |
| 7,685,237 B1 | 3/2010 | Weaver et al. | |
| 7,882,222 B2 | 2/2011 | Dolbier et al. | |
| 7,990,384 B2 | 8/2011 | Cosatto et al. | |
| 7,996,818 B1 | 8/2011 | Venugopal | |
| 8,026,918 B1 | 9/2011 | Murphy | |
| 8,527,625 B2 | 9/2013 | Dolbier et al. | |
| 8,957,914 B2 | 2/2015 | Dolbier et al. | |
| 9,324,173 B2 | 4/2016 | Castelli et al. | |
| 2001/0030667 A1 | 10/2001 | Kelts | |
| 2001/0037316 A1 | 11/2001 | Shiloh | |
| 2001/0037508 A1 * | 11/2001 | Hindus | H04L 29/06 725/105 |
| 2002/0129106 A1 | 9/2002 | Gutfreund | |
| 2002/0152268 A1 | 10/2002 | Kureshy et al. | |
| 2002/0188678 A1 | 12/2002 | Edecker et al. | |
| 2003/0014524 A1 | 1/2003 | Tormasov | |
| 2003/0115132 A1 | 6/2003 | Iggland | |
| 2003/0117485 A1 | 6/2003 | Mochizuki et al. | |
| 2003/0177187 A1 | 9/2003 | Levine et al. | |
| 2003/0177195 A1 | 9/2003 | Han et al. | |
| 2004/0017385 A1 | 1/2004 | Cosman et al. | |
| 2004/0030741 A1 | 2/2004 | Wolton et al. | |
| 2004/0054740 A1 | 3/2004 | Daigle et al. | |
| 2004/0068518 A1 | 4/2004 | McDowell | |
| 2005/0021625 A1 | 1/2005 | Fujimura et al. | |
| 2005/0137015 A1 | 6/2005 | Rogers et al. | |
| 2005/0204287 A1 * | 9/2005 | Wang | H04N 21/47205 715/716 |
| 2005/0216558 A1 | 9/2005 | Flesch et al. | |
| 2006/0031080 A1 | 2/2006 | Mallya et al. | |
| 2006/0053380 A1 | 3/2006 | Spataro et al. | |
| 2006/0115157 A1 * | 6/2006 | Mori | G06K 9/00221 382/190 |
| 2006/0123127 A1 | 6/2006 | Littlefield | |
| 2006/0181535 A1 | 8/2006 | Watt | |
| 2006/0256135 A1 | 11/2006 | Aoyama et al. | |
| 2007/0013691 A1 | 1/2007 | Jung et al. | |
| 2007/0035831 A1 | 2/2007 | Gutierrez Novelo | |
| 2007/0126733 A1 | 6/2007 | Yang et al. | |
| 2007/0130001 A1 | 6/2007 | Jung et al. | |
| 2007/0188502 A1 | 8/2007 | Bishop | |
| 2007/0203828 A1 | 8/2007 | Jung et al. | |
| 2007/0220435 A1 | 9/2007 | Sriprakash et al. | |
| 2007/0233605 A1 | 10/2007 | Mueller et al. | |
| 2007/0233839 A1 | 10/2007 | Gaos | |
| 2007/0248261 A1 | 10/2007 | Zhou et al. | |
| 2007/0260984 A1 * | 11/2007 | Marks | A63F 13/06 715/706 |
| 2007/0294171 A1 | 12/2007 | Sprunk | |
| 2008/0005237 A1 | 1/2008 | Borys et al. | |
| 2008/0052242 A1 * | 2/2008 | Merritt | G06F 21/10 705/59 |
| 2008/0059570 A1 | 3/2008 | Bill | |
| 2008/0104079 A1 | 5/2008 | Craig | |
| 2008/0155019 A1 | 6/2008 | Wallace et al. | |
| 2008/0215434 A1 | 9/2008 | Jung et al. | |
| 2008/0215972 A1 | 9/2008 | Zalewski et al. | |
| 2008/0215975 A1 | 9/2008 | Harrison et al. | |
| 2008/0215994 A1 | 9/2008 | Harrison et al. | |
| 2008/0228607 A1 | 9/2008 | Jung et al. | |
| 2008/0263460 A1 | 10/2008 | Altberg et al. | |
| 2008/0267282 A1 * | 10/2008 | Kalipatnapu | H04L 12/1822 348/14.08 |
| 2008/0267449 A1 | 10/2008 | Dumas et al. | |
| 2008/0274769 A1 | 11/2008 | Linden | |
| 2008/0307066 A1 | 12/2008 | Amidon et al. | |
| 2009/0002479 A1 * | 1/2009 | Sangberg | H04N 7/147 348/14.02 |
| 2009/0024636 A1 | 1/2009 | Shiloh | |
| 2009/0027337 A1 | 1/2009 | Hildreth | |
| 2009/0046094 A1 | 2/2009 | Hamilton, II et al. | |
| 2009/0049385 A1 * | 2/2009 | Blinnikka | G06F 3/0481 715/719 |
| 2009/0055484 A1 | 2/2009 | Vuong et al. | |
| 2009/0077475 A1 | 3/2009 | Koster et al. | |
| 2009/0089684 A1 | 4/2009 | Boss et al. | |
| 2009/0100352 A1 | 4/2009 | Huang et al. | |
| 2009/0106347 A1 | 4/2009 | Harwood et al. | |
| 2009/0110352 A1 | 4/2009 | Schorpp et al. | |
| 2009/0113319 A1 | 4/2009 | Dawson et al. | |
| 2009/0138943 A1 | 5/2009 | Kawanaka | |
| 2009/0144173 A1 | 6/2009 | Mo et al. | |
| 2009/0164518 A1 | 6/2009 | Ghafoor | |
| 2009/0187604 A1 | 7/2009 | Guo et al. | |
| 2009/0241049 A1 | 9/2009 | Bates et al. | |
| 2009/0251457 A1 | 10/2009 | Walker et al. | |
| 2009/0288015 A1 * | 11/2009 | Fujioka | A63F 13/12 715/747 |
| 2009/0300521 A1 | 12/2009 | Jerrard-Dunne et al. | |
| 2009/0307611 A1 | 12/2009 | Riley | |
| 2010/0020100 A1 | 1/2010 | Dolbier et al. | |
| 2010/0026681 A1 | 2/2010 | Dolbier et al. | |
| 2010/0030854 A1 | 2/2010 | Dolbier et al. | |
| 2010/0031164 A1 | 2/2010 | Dolbier et al. | |
| 2010/0070859 A1 * | 3/2010 | Shuster | A63F 13/358 715/706 |
| 2011/0039526 A1 | 2/2011 | Ait-Ameur | |
| 2012/0064878 A1 | 3/2012 | Castro Castro et al. | |
| 2012/0113937 A1 | 5/2012 | Aramoto et al. | |
| 2012/0221955 A1 | 8/2012 | Raleigh et al. | |
| 2012/0257571 A1 | 10/2012 | Liao | |
| 2012/0307798 A1 | 12/2012 | Zhou et al. | |
| 2013/0016657 A1 | 1/2013 | Muhanna et al. | |
| 2013/0149987 A1 | 6/2013 | Cheng et al. | |
| 2014/0161026 A1 | 6/2014 | Stojanovski et al. | |
| 2017/0006091 A1 | 1/2017 | Cabrera et al. | |

OTHER PUBLICATIONS

Mojtaba Hosseini, et al., INSPEC: A Haptic Virtual Environment for Industrial Training, AN-7568979, pp. 25-30, 2002, IEEE.

(56) References Cited

OTHER PUBLICATIONS

John W. Barrus, et al., Locales: Supporting Large Multiuser Virtual Environments, A Mitsubishi Electric Research Laboratory on Virtual Reality Technology, Document No. 0272, Nov. 1996, pp. 50-57.
Jim Purbrick, et al., An Extensible Event-based Infrastructure for Network Virtual Worlds, Proceedings of the IEEE Virtual Reality 2002 (VR' 02), 7 pages.
Pedro Ferreira, et al., Security and Privacy in a Middleware for Large Scale Mobile and Pervasive Augmented Reality, Software, Telecommunications and Computer Networks, 2007, SoftCOM 2007, 15th International Conference on; Sep. 27-29, 2007, Conference Publications pp. 1-5.
Carlos Santos, et al., Interactive Systems, Design, Specification and Verification, International Workshop, 10th, Jun. 11-13, 2003 DSV-IS 2003 Revised Papers (Lecture Notes in Computer Science, vol. 2844), pp. 410-414, A Navigation and Registration System for Mobile and Augmented Environments.
Matthew Lewis, et al., Interactively Evolving Environment Maps with Continuous Layered Pattern Functions, Advanced Computing Center for the Arts and Design, The Ohio State University, pp. 1-12, Computer Animation 2002.
Gurminder Singh, et al., Networked Virtual Worlds, Institute of Systems Science. National University of Singapore, Document No. 0-8186-7062, 1995, pp. 44-49.
Tom Chen, et al., On Integrating Multi-Sensory Components in Virtual Environments, pp. 1-6, Dec. 1998.
Michael E. Papka, et al., UbiWorld: An Environment Integrating Virtual Reality, Supercomputing and Design, Mathematics and Computer Science Division, Argonne National Laboratory, Heterogeneous Computing Workshop, Apr. 1, 1997, pp. 306-307.
Richard M. Satava, et al., An Integrated Medical Virtual Reality Program, Mar. / Apr. 1996, IEEE Engineering in Medicine and Biology, pp. 94-97, and 104.
Horoyuki Tarumi, et al., Communication through Virtual Active Objects Overlaid onto the Real World, Department of Social Informatics, Graduate School Informatics, Kyoto University, CVE '00 Proceedings of the third international conference on Collaborative virtual environments, Sep. 10-12, 2000, 10 pages.
Tomohiro Tanikawa, et al., A Study for Image-based Integrated Virtual Environment, Proceedings of the International Symposium on Mixed and Augmented Reality (ISMAR'02), 2002, 9 pages.
Pandzic et al., "A flexible architecture for Virtual Humans in Networked Collaborative Virtual Environments", 1997, pp. 1-15.
Purbrick et al., "An Extensible Event-based Infrastructure for Networked Virtual Worlds", 2002, pp. 1-7.
McNett et al., "Usher: An Extensible Framework for Managing Clusters of Virtual Machines", 2007, pp. 1-25.
Tran et al., "An Open Middleware for Large-scale Networked Virtual Environments", 2002, pp. 1-8.
Explicit Conversion of Base Class to Derived Class, Microsoft Developer Network, May 2007, pp. 1-11.
Xiaojun Shen, et al., "A Heterogeneous Scalable Architecture for Collaborative Haptics Environments," 2003.
Jeremie Allard, et al., "FlowVR: A Middleware for Large Scale Virtual Reality Applications," 2004.
Qingping Lin, et al., "Addressing Scalability Issues in Large-Scale Collaborative Virtual Environment," 2006.
Gabriel Zachmann, "A Language for Describing Behavior of and Interaction with Virtual Worlds," VRST '96, Proceedings of the ACM Symposium on Virtual Reality Technology, pp. 143-150, 1999, Jul. 1996.
Shinya Kawanaka, "A Method to do Shopping in Securely by Making a Copy of Virtual World," Document No. JP920070131, May 28, 2009.
Mary Lou Maher, et al., Agents for multi-disciplinary design in virtual worlds, Artificial Intelligence for Engineering Design, Analysis and Manufacturing, vol. 21, No. 3, 2007.
Elhadi Shakshuki, et al., Agent Frameworks in FCVW, Proceedings of the 19th International Conference on Advanced Information Networking and Applications (AINA '05), 2005.
Tsuneo Yoshikawa, et al., Construction of Virtual World Using Dynamic Modules and Interaction MOdules, Proceedings of the 1996 IEEE International Conference on Robotics and Automation Minneapolis, Minnesota, Apr. 1996, pp. 2358-2364.
Matias Rauterberg, Entertainment Computing—ICEC 2004, Third International Conference Eindhoven, The Netherlands, Sep. 1-3, 2004, Proceedings, pp. 241-247.
Wikipedia, "Universally Unique Identifier", [online], [Retrieved on Sep. 26, 2016]. Retrieved from the Internet at <URL: https://en.wikipedia.org/wiki/Universally_unique_identifier>, page last modified on Sep. 18, 2016, Total 6 pp.

* cited by examiner

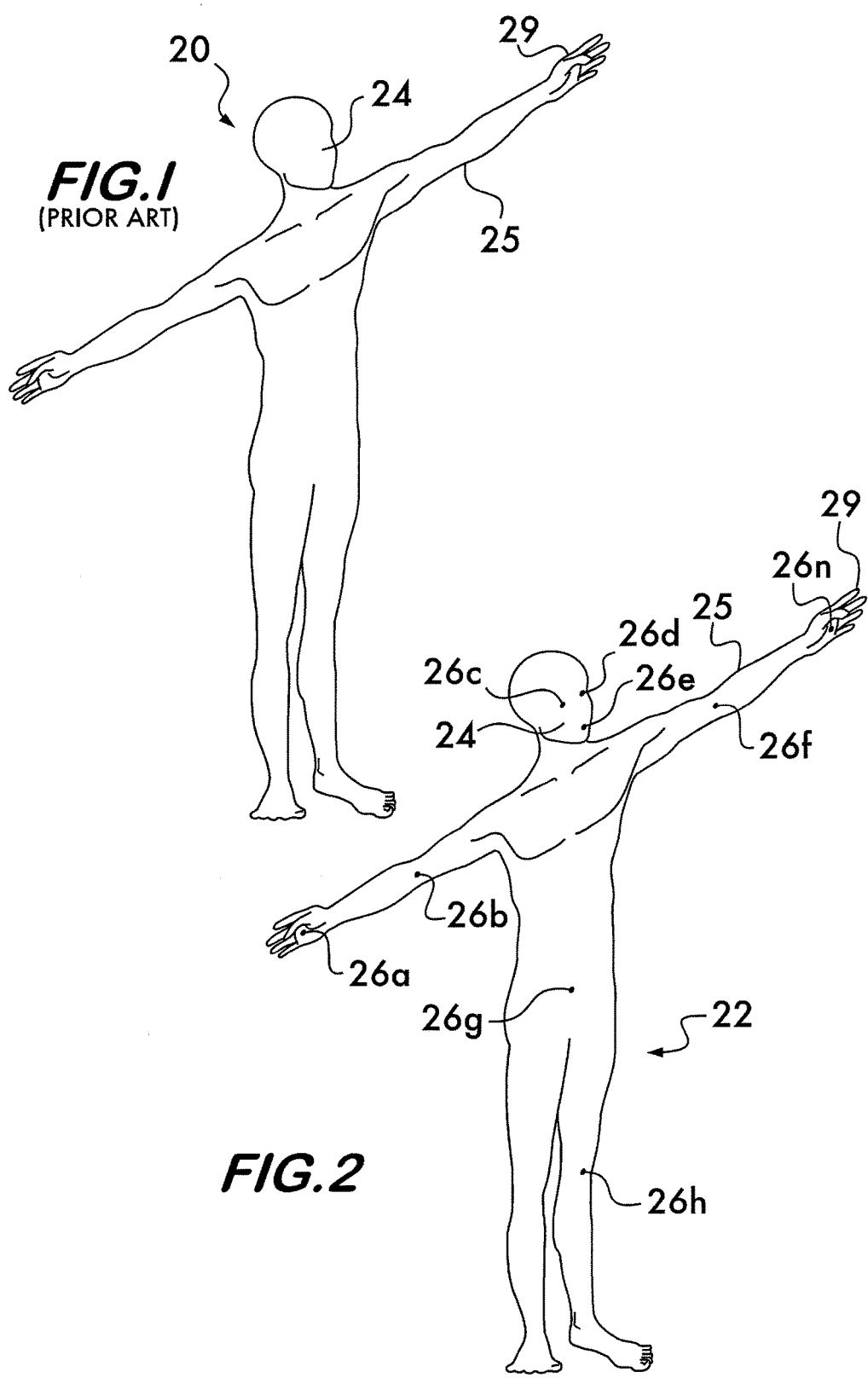

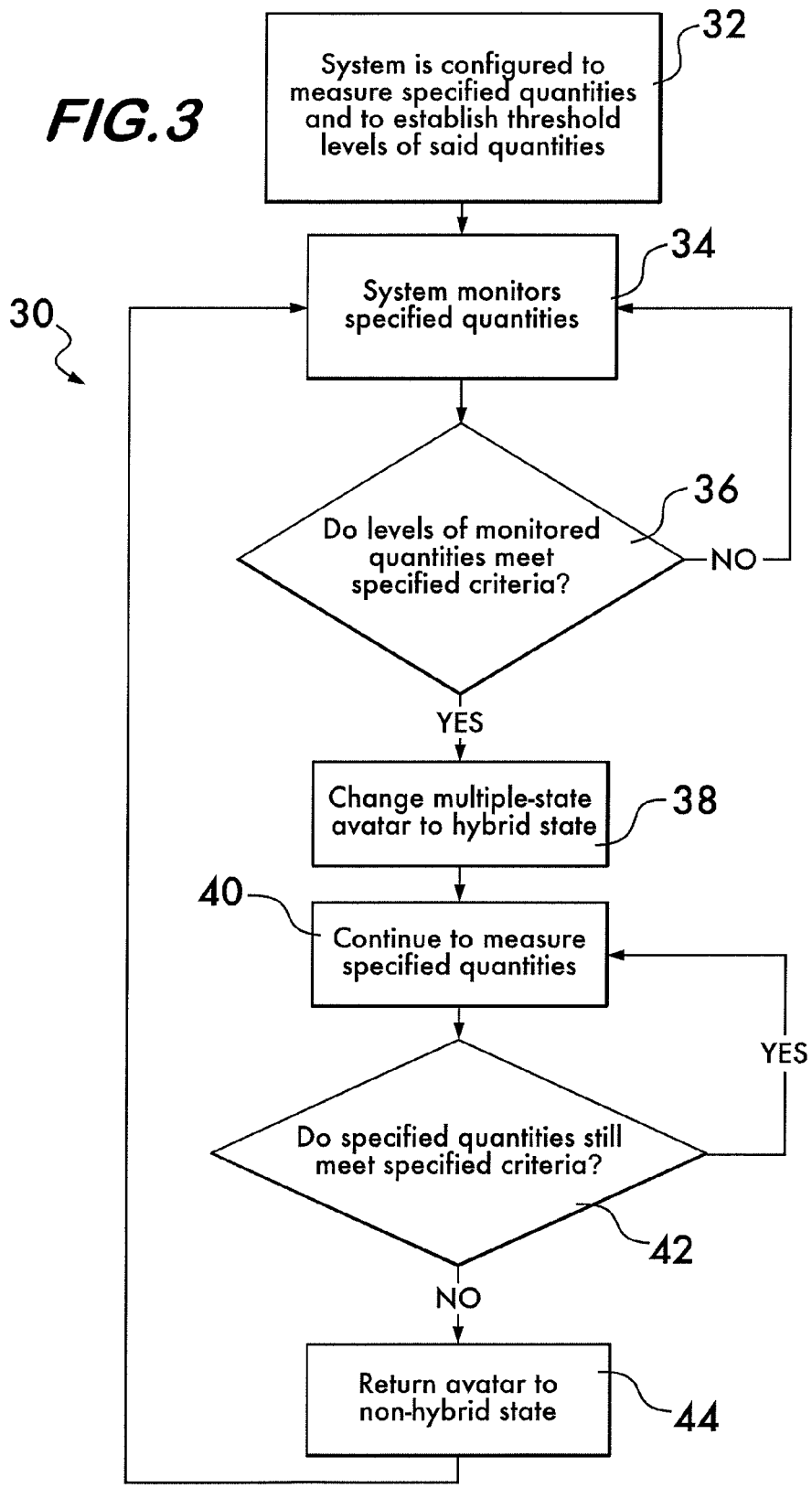

SYSTEM AND METHOD FOR ENABLING MULTIPLE-STATE AVATARS

CROSS-REFERENCE TO RELATED APPLICATION

Under 35 U.S.C. 120, this application is a Continuation Application and claims priority to U.S. application Ser. No. 12/174,985, filed Jul. 17, 2008, entitled "SYSTEM AND METHOD FOR ENABLING MULTIPLE-STATE AVATARS," which is incorporated herein by reference.

BACKGROUND

This invention relates generally to computer graphics and more particularly to the modification of computer graphics.

DESCRIPTION OF RELATED ART

An avatar is a graphical element selected by a user of a system that other users can see and which can represent the user. Avatars are frequently used in virtual universes, which are computer-based simulated environments. An avatar often takes the form of a cartoon-like human but may be any other graphical representation. The avatar may be a static image or a computer-generated animation. Many virtual universes are represented using three dimensional graphics and landscapes, and may be populated by many thousands of users, known as residents. Each resident can have one or more avatars. Residents of virtual universes can traverse and inhabit the virtual universes, and interact with one another through the use of avatars. Other terms for virtual universes include virtual worlds, metaverses, 3D internet, virtual realities, massively multiplayer online games and virtual realms.

Users or residents of virtual universes often interact with each other through their avatars using known chat-room technology. For example, in order to mimic the behavior of real life human interactions, when an avatar speaks a text window can appear on a user interface (UI) of the other users whose avatars are within hearing range of the speaking avatar. The hearing range may vary based upon whether an avatar speaks in a normal voice, a raised voice or a whisper. Audio is also sometimes used to convey speech.

Often, virtual universes resemble the real world, such as in terms of physical laws, landscapes, houses and other buildings. Example virtual universes can include: Second Life, Entropia Universe, The Sims Online, There, Red Light Center and several massively multiplayer online games such as EverQuest, Ultima Online, Lineage or World of Warcraft.

Avatars have been used in conjunction with the transmission of animated video messaging. One example of such animated video messaging is associated with Logitech Orbit webcams and Logitech Video Effects technology. An exemplary use of the Logitech technology is disclosed at <http://www.youtube.com/watch ?v=r7Gn2TyEyHw>. This animated video messaging allows the user to convey animated representations of head and facial movements through an avatar.

Avatars as known in the prior art suffer from limitations in their ability to convey facial expression or other body language. Avatars display gross motions and gestures, and provide rough feature characterization. These graphical feature simplifications and limitations are due partly to the need for limiting the communication bandwidth between the server and the clients, and partly due to the need for maintaining a manageable rendering cost of the avatar at the client computing devices. As a result, users interacting through the use of prior art avatars can lose cues typically present in interpersonal communications. Such cues are useful for conveying and understanding emotions.

SUMMARY

A method of rendering an electronic graphical representation of a user of a computerized system includes providing a plurality of states for the electronic graphical representation including first and second differing states, monitoring a measurable quantity to provide a monitored quantity, and changing a state of the graphical representation from the first state to the second state based upon the monitored quantity. The graphical representation is an avatar and the method includes defining a receptor point associated with the avatar and associating an object with the receptor point. The receptor point is located on the avatar. The plurality of states includes a non-hybrid state. The plurality of states includes a hybrid state. The hybrid state includes a static image hybrid state and a video hybrid state. The video hybrid state includes a live video hybrid state and a pre-recorded video hybrid state.

The measurable quantity includes a quantity representative of a movement of a user including movement of a human facial feature. The measurable quantity includes a quantity representative of a movement of a human hand. The changing of the state of the avatar includes displaying the change to a limited subset of other users of the computerized system. The changing of the state of the avatar is based upon network communication capabilities. The changing of the state of the avatar is based upon measured network communication performance. The changing of the state of the avatar is based upon user computer processing capabilities. The changing of the state of the avatar is based upon measured system computer processing performance.

The changing of the state of the avatar is limited to a subset of permitted states in accordance with a user preference. The changing of the resolution of the avatar is limited to a subset of permitted states in accordance with the user preference. The limiting of the changing of the state of the avatar to a subset of permitted states is performed in accordance with a service contract. The limiting of the changes of resolution of the avatar to a subset of permitted states is performed in accordance with a service contract.

Furthermore, the subject invention is directed to a system for enabling multiple-state hybrid avatars that may be adaptively rendered as traditional avatars, portions of which are merged with a video feed. The video feed may, for example, be a video of the face of a real person superimposed on the face of an avatar. A switch between a traditional mode and a video mode is performed automatically according to several criteria. The video of an actual face provides facial and other cues to improve communication compared with those avatars known in the prior art.

Through various embodiments of the subject invention, virtual universe users are presented with the typical visual cues (e.g., posture, subtle facial expressions and hand gestures) that are useful in face-to-face communication. Virtual universe users can benefit from communicating these lifelike cues and expressions.

BRIEF DESCRIPTION OF THE FIGURES

FIG. 1 is a depiction of a standard avatar as known in the prior art.

FIG. 2 is a depiction of an embodiment of one example of a multiple-state avatar.

FIG. 3 is a flow chart representing system steps for practicing an embodiment of the invention.

DETAILED DESCRIPTION

Referring now to FIG. 1, there is shown an avatar 20 as known in the prior art. The prior art avatar 20 may be displayed as a static image, a digital animation or in any other manner known to those skilled in the art. All features of the prior art avatar 20, including for example the face 24 or arms 25, are limited to expressions capable of being rendered as a static image or graphical animation.

Referring now to FIG. 2, an embodiment of the disclosed system method is capable of rendering a multiple-state avatar 22. The multiple-state avatar 22 is a hybrid avatar that can have any number of multiple-state avatar receptor points 26a-n which may be located on any areas of the multiple-state avatar 22. In the embodiment of the multiple-state avatar 22 shown, multiple-state avatar receptor points 26a-n, sometimes referred to more conveniently as receptor points 26a-n, can be located on the face 24, arms 25 or hands 29, or any other area of the body while the prior art avatar 20 does not have such receptor points 26a-n on its face 24, arms 25 or hands 29. While the avatars 20, 22 shown resemble a human, avatars rendered by the method disclosed herein may take any form permitted by the virtual universe in which they reside.

As also shown in FIG. 2, embodiments of the present invention can include a system for enabling multiple-state avatars 22 that may be rendered adaptively as traditional avatars, portions of which can be merged with a video feed. The receptor points 26a-n of the multiple-state avatars 22 can thus be specialized regions for receiving images or other objects. The receptor points 26a-n can be located directly on, adjacent to, in the vicinity of, or in any other way associated with the multiple-state avatar 22. The receptor points 26a-n and the triggering events may be designated by users, by the virtual universe in which the multiple-state avatar 22 is used, or by a third party. While the face 24 of the multiple-state avatar 22 can be a commonly used receptor point 26a-n, any other regions of the multiple-state avatar 22 may be used as a receptor point 26a-n. Use of multiple regions, whether simultaneously or in sequence, can thereby add realism to the communication represented by the multiple-state avatar 22.

In one embodiment of the invention, the receptor points 26a-n of a multiple-state avatar 22 may be associated with a static image, a live video, a pre-recorded video or any other kind of object. A rendering of a multiple-state avatar 22 having no objects associated with any of its receptor points 26a-n can be referred to as a rendering of a non-hybrid state avatar. A rendering of a multiple-state avatar 22 having an object associated with one or more receptor points 26a-n can be understood to be a rendering of a hybrid state avatar.

Furthermore, many types of hybrid state avatars are possible. For example, the state of a hybrid state avatar having a static image associated with one or more of its receptor points 26a-n can be understood to be a static image hybrid state. As a further example, the state of a hybrid state avatar having a live video associated with one or more receptor points 26a-n can be understood to be a live video hybrid state. The state of a hybrid state avatar having a pre-recorded video associated with one or more receptor points 26a-n can be understood to be a pre-recorded video hybrid state, and so on for any other kind of object associated with a receptor point 26a-n of a multiple-state avatar 22. Both the live video hybrid state and the pre-recorded video hybrid state can sometimes be referred to as video hybrid states for convenience.

A multiple-state avatar 22 can have different kinds of objects, for example a static image and a live or pre-recorded video, associated with different receptor points 26a-n. Even though an object can be associated with a multiple-state avatar 22 in the foregoing manner, in an alternate embodiment it can be rendered for display in the vicinity of the multiple-state avatar 22, rather than on the multiple-state avatar 22, or in any other location. Furthermore, objects can move from one receptor point 26a-n to another, or from the multiple-state avatar 22 to the vicinity of the multiple-state avatar 22, and back depending on any predetermined triggers.

The live video or pre-recorded video associated with a multiple-state avatar 22 can be accompanied by audio or visual effects when it is triggered and displayed. The replacing video may be a video of an actual person and can correspond to the part of the multiple-state avatar 22 being replaced. For example, in a multiple-state avatar 22 having a receptor point 26a-n on its face 24, a substituted or superimposed video element of the multiple-state avatar 22 may be a live video or a recorded video of the face of the user controlling the multiple-state avatar 22, or any other object.

In another example, arm 25 or hand 29 movements of the multiple-state avatar 22 may be replaced by video images of the user's arms or hands. Alternatively, to reduce network bandwidth use, several static snapshots or other representations of a real person's face or other feature, or other objects, may be saved in a database or on a file system and displayed on the multiple-state avatar 22 at an appropriate receptor point 26a-n. For example, a static image of a smiling face and a frowning face of a user or other human or another object, may be stored and alternately superimposed upon a receptor point 26a-n on the face 24 of the multiple-state avatar 22 when triggered.

Multiple-state avatars 22 within the disclosed system can change state in response to any kind of triggers such as specified, measurable actions, events or parameters in the virtual universe or elsewhere. The monitored events or parameters can be associated with a user of a multiple state avatar 22, some other avatars or other entities in a virtual universe or elsewhere.

State changes can include changes from a traditional graphical avatar such as the prior art avatar 20 to a hybrid multiple-state avatar 22 (such as a live video multiple-state avatar 22), and changes back to a traditional graphical state. State changes in response to detected triggers can also include a change from a state where an image is superimposed on one receptor point 26a-n, to a state where the same or a different image is displayed on a different receptor point 26a-n. The system can monitor any measurable quantities to detect a trigger for changing the state of an avatar receptor point 26a-n.

The measurable quantities for triggering state changes in the multiple-state avatar 22 can include, but are not limited to, physical movements by a human user controlling the multiple-state avatar 22, or movements by any other person. Additionally, the measurable quantities used for triggering the state changes can include, but are not limited to, movement of any physical object, the actuation of a monitored device, the occurrence on any event, for example the occurrence of a sound or the appearance of light, communication network functioning, user computer functioning, or the passage of time. Prior to the measured quantities satisfying the specified criteria, the multiple-state avatar 22 may be displayed using any standard virtual universe rendering methods. When a measured quantity or quantities meet the specified criteria or requirements the system can initiate a state change. Additionally, the system can initiate a reverse state change or other state change when a measured quantity or quantities no longer satisfies the specified criteria. In a preferred embodiment the quantities and the thresholds of the quantities may be configurable. By way of example, the system may be configured to activate state changes based upon a measured virtual universe distance between two or more virtual universe multiple-state avatars 22. The system may monitor that distance and cause a state change in one or more of the multiple-state avatars 22 when the distance falls below a configured threshold or meets some other configurable criteria. The threshold distance can then be modified as desired. Alternate embodiments of the system may allow a virtual universe, a user or a third party to specify and change the configurable values.

The use of multiple-state avatars such as the multiple-state avatar 22 allows users of a virtual universe to experience and interact with other users of the virtual universe in a more life-like manner. Further increasing the life-like quality of the experience, the disclosed system may allow a state change of a multiple-state avatar 22 to be viewed by one or more subsets of virtual universe users, and not allow it to be viewed by other subsets of virtual universe users. Virtual universe users outside of a viewing subset or subsets can thus be unable to observe some or all of the state changes of the multiple-state avatar 22.

A preferred embodiment of the invention can determine the subsets that can view the state change based upon any configurable criteria, such as distance between the two multiple-state avatars 22. The configurable criteria can be changed at any time according to any event or parameter. In this way, the multiple-state avatars 22 can recreate the real-life ability of those in close proximity being able to see or hear a person or observe specific movements or expressions of the person, while those further away may not see or hear the same person, movements or expressions. Similarly, in a preferred embodiment, users whose perspective would reveal only the back of an active multiple-state avatar 22 may not see facial expressions or other changes on the front or side of the multiple-state avatar 22. In the preferred embodiment, the system is configurable to define the criteria related to this functionality.

Thus, further replicating real life experience, in an embodiment of the system in which multiple-state avatars 22 have many states, the system may calculate multiple user subsets and show different avatar states to those different user subsets. For example, the system may be configured to display an avatar's full video state, including facial expressions and body movements to users within a specified distance. Simultaneously, users within (or outside if desired) a greater specified distance may see only gross body movements, such as arm motions, but not facial expressions.

In one preferred embodiment, the system can monitor a user's face, using known prior-art facial scanning software and known cameras associated with computing devices. If the monitored person in real life is smiling or manifesting some other predetermined cue, a video of the user or a photograph of a stored smiling face can be superimposed on a facial receptor point 26a-n of the user's multiple-state avatar 22. A similar methodology may be employed to monitor other features of the user or another person or object, such as hands or arms, and movement of those features. If the amount of movement of a user, another person, or an object exceeds a specified threshold, the system can trigger a state change corresponding to the type and level of movement. The determination of the expressions or movements of a person or an object being monitored can be based upon any type of videographing techniques know to those skilled in the art.

In a preferred embodiment, the user may also cause state changes of a multiple-state avatar 22 using input devices such as a standard computer keyboard or mouse. For example, in one embodiment of the system the user may press a defined combination of keys such as Alt-S to cause the multiple-state avatar 22 to change state, for example to display a live video, a stored video, or a stored image associated with smiling or some other expression. The system may be configured to permit other keyboard shortcuts to be used to control state changes of the multiple-state avatar 22. In alternate embodiments, any other input devices and methods may be used to cause state changes. Examples of such input devices whose actuation can be monitored in order to provide a trigger for changing a state of a multiple-state avatar 22 may include, but are not limited to, joysticks, potentiometers, audio detector and audio commands, voice recognition, temperature detectors, timers and any type of motion detecting methods.

A preferred embodiment of the system and method of the present invention can further include a method to minimize the system's impact upon network performance and to maintain operational speed via networked communications. Virtual universe users typically interact in real-time across network connections. If a user connects to a virtual universe via a slow or congested connection, or if the user connection undergoes a slow-down, real-time transmission of multimedia content to the user may be compromised. In order to minimize any lag in content delivery, a preferred embodiment can detect the speed of the connection for a user to whom content is to be sent. Based upon the connection speed, the system may determine that transmission to a user with a slow connection to the system should be modified. For example, the system may determine that the user should receive transmission of content that requires less bandwidth, and therefore less time to implement. The system may thus substitute some type of content requiring less bandwidth. For example, a user who, according to system rules, should normally observe live video corresponding to another avatar's hybrid state, may receive static images representing the other user's multiple-state avatar 22 instead, at least temporarily. Other examples of lower bandwidth content can include, but are not limited to, low frame-rate video and low-resolution video rather than high-resolution video.

In one embodiment of the invention, the system may allow users to select whether the functionality of a multiple-state avatar 22 should be disabled in order to minimize the time required to receive transmission of virtual universe content. Similarly, one embodiment can permit a virtual universe administrator to configure a system to forego transmission of hybrid content under certain circumstances. Such a configuration may be desirable to overcome unexpected network slow-downs or other network events. Individual users may also desire the reduced content when their personal computers lack the processing resources necessary to keep up with data representing real-time communication requirement, such as the requirements for supporting the multiple-state avatar 22.

In a preferred embodiment a user can cause the state changes of a multiple-state avatar 22 to continue in effect for a limited period of time within a session, until the end of a session, or past the end of a session and into a future session. For example, a business transaction or a business meeting can be held in a virtual universe. A user may want to trigger a state in which high definition details of a multiple-state avatar 22 is available for a potion of a meeting or until the end of a meeting. This can improve mutual trust if low resolution avatars are considered a way of concealing emotions or expressions thereby triggering mistrust. Additionally, when a user gives a presentation in a virtual universe the user may want to trigger a high resolution mode for the duration of the presentation regardless of any other triggers. In another example of a business meeting, the method and system of the invention can normally maintain the highest level of resolution for all multiple-state avatars 22, and not try to determine when to increase the avatar resolution. Rather, it can determine which avatar resolution can be decreased in order to minimize the impact on the discussion.

In an alternate embodiment of the disclosed invention, the system may maximize available bandwidth by distributing avatar information to users via peer-to-peer (P2P) systems. In this embodiment, users can download avatar content from one or more other system users. This direct download from other users may, but is not required to, occur in conjunction with downloads from the system.

Referring now to FIG. 3, there is shown a flow chart 30 depicting method steps that can be performed to monitor specified quantities or other triggers and change the state of a multiple-state avatar 22 based upon the level of the monitored quantities or other triggers in a preferred embodiment. For example, a trigger can be used to cause the asking of a question. An answer to the question can cause a change to a high resolution display or some other change. In the flow chart 30, the virtual universe administrator or the user can configure the system to monitor any quantities or triggers relative to specified criteria as shown in block 32. The system monitors the values of those quantities as shown in block 34.

The system can continuously or periodically evaluate whether the monitored quantity or quantities meet specified criteria as shown in decision 36. If the measured quantities do not meet the specified criteria as determined in decision 36, the system can continue to monitor the specified quantities as shown in block 34. If the quantities monitored in block 34 meet the specified criteria as determined in decision 36 the system can change the state of the multiple-state avatar 22 to an alternate state as shown in block 38. The state change can be a change of any kind with respect to any receptor point 26a-n of the multiple-state avatar 22. The state to which the multiple-state avatar 22 is changed may be a static image hybrid state, a live video hybrid state, a pre-recorded video hybrid state or any other type of avatar state as previously described.

Having caused the avatar state to change in block 38, the system can continue to monitor the specified quantities with relation to the specified criteria as shown in block 40 of the flow chart 30. The system can periodically or continuously evaluate whether the measured quantities satisfy the specified criteria as shown in decision 42. If the measured quantities continue to meet the specified criteria, the system can continue to measure the specified quantities in block 40. If the measured quantities no longer meet the specified criteria, the system can cause the multiple-state avatar 22 to return to a previous state as shown in block 44. Furthermore, the multiple-state avatar 22 can be caused to change to any other state at that point. The system can return to block 34 and continue monitoring the specified measurable quantities.

Thus, while the flow chart 30 can illustrate a process suitable for controlling a multiple-state avatar 22 having two states (e.g. hybrid and not hybrid states or two different hybrid states), a person of ordinary skill in the art will understand that similar measurement, comparison and state change steps may be implemented for multiple-state avatars 22 having any number of states. This will allow the system to change the multiple-state avatar 22, for example, sequentially from a static image state, to one type of hybrid state, to another type of hybrid state.

In practice, by way of example, the disclosed system may be employed in an online virtual retail store. A user multiple-state avatar 22 may approach a service avatar (which can also be a multiple-state avatar 22) in the online store and engage in interaction related to a sales transaction. All or selected portions of the service multiple-state avatar 22 may be include receptor points 26a-n. As such, a more realistic conversation can take place between the user and the service personnel given the facial movements, gestures, lip movements, and other aspects of their respective multiple-state avatars 22. The advantages of the system over traditional avatar technology may allow an online merchant to derive greater financial return as a result of the more life-like interaction.

In a further example, the subject system may be employed to facilitate online conferencing. In this situation, the multiple-state avatar 22 of the person speaking may be switched to a hybrid state. This allows the speaking user to communicate more effectively and realistically with the other users. Similarly, the multiple-state avatar 22 of the users not speaking may also trigger the hybrid state, thereby allowing the speaking user to view the real time reactions of participating users through their respective multiple-state avatars 22. The system may also trigger a state change by analyzing where other multiple-state avatars 22 are looking. A multiple-state avatar 22 receiving the focus of another user avatar can undergo a state change. As a result, the user experience and the realism of the conference can be enhanced for all users of the system.

In another example, the system may be used in an online virtual party. Any number of users can attend the party, each being represented by an avatar such as the multiple-state avatar 22. The system's methods for determining user subsets to observe avatar states may calculate any number of multiple user subsets. Each user subset can view different avatar behavior relative to other multiple-state avatars 22. In such a virtual party, a user A may see the full live video state of the multiple-state avatar 22 of a user B with whom he is speaking directly. User A may see different states of other users at the party. Possible examples include user A observing the gross body movements of a multiple state avatar C across the room, but not the facial expressions of avatar C. Further still, user A may observe only a traditional mode of a fourth avatar D, whose back is to A.

In any of the preceding examples, the system's methods for reducing the impact on network performance may be employed if necessary to maintain the appearance of real-time interaction between users when network performance is reduced or when users connect to the system via a slow internet connection. The states of multiple-state avatars 22 can be restricted to a subset of the possible states either by service contracts, by user preferences, or in any other agreed upon way. The restrictions can be imposed on a specific session or more generally.

While the invention has been described in detail and with reference to specific examples thereof, it will be apparent to one skilled in the art that various changes and modifications can be made therein without departing from the spirit and scope thereof.

What is claimed is:

1. A method for rendering a virtual world avatar of a computerized system, comprising:
    defining a plurality of receptor points located on the virtual world avatar;
    determining that the virtual world avatar has a hybrid state in which a first receptor point of the plurality of receptor points is associated with a first object and a second receptor point of the plurality of receptor points is associated with a second object;
    moving the first object from the first receptor point of the plurality of receptor points to a third receptor point of the plurality of receptor points;
    changing a state of the virtual world avatar from the hybrid state to a non-hybrid state based upon one or more measurable quantities satisfying one or more thresholds, wherein the non-hybrid state indicates that no object is associated with the second receptor point of the plurality of receptor points and the third receptor point of the plurality of receptor points; and
    in response to the one or more measurable quantities no longer satisfying the one or more thresholds, reverting the state of the virtual world avatar from the non-hybrid state back to the hybrid state.

2. The method of claim 1, wherein video for another object associated with another receptor point of the plurality of receptor points comprises a pre-recorded video.

3. The method of claim 1, wherein the first object moves from the first receptor point to a vicinity near the virtual world avatar.

4. The method of claim 1, wherein the changing of the state is limited to a subset of permitted states in accordance with a controller preference.

5. The method of claim 1, wherein a measurable quantity of the one or more measurable quantities comprises any of physical movements of a controller of the virtual world avatar and parameters associated with other virtual world avatars.

6. The method of claim 5, wherein the physical movements comprise a quantity representative of a movement of any of a facial feature and a hand.

7. The method of claim 5, further comprising:
    distributing avatar information to the controller by way of a peer-to-peer system.

8. The method of claim 1, wherein a measurable quantity of the one or more measurable quantities comprises a quantity representative of an audio signal.

9. The method of claim 1, wherein a measurable quantity of the one or more measurable quantities comprises a quantity representative of a computer system capability.

10. The method of claim 1, wherein a measurable quantity of the one or more measurable quantities comprises a quantity representative of an actuation of a monitored device.

11. The method of claim 10, wherein the monitored device comprises any of a keyboard, a joy stick, and an audio detector.

12. The method of claim 1, wherein a measurable quantity of the one or more measurable quantities comprises a quantity representative of a communication network performance.

13. The method of claim 1, wherein a measurable quantity of the one or more measurable quantities comprises a quantity representative of a controller computer processing capability.

14. The method of claim 1, further comprising:
    limiting the changing of the state to a subset of a plurality of states.

15. The method of claim 1, further comprising:
    maintaining the non-hybrid state for a portion of a system session.

16. The method of claim 15, further comprising:
    maintaining the hybrid state for a portion of the system session.

17. The method of claim 1, further comprising:
    changing a resolution of the virtual world avatar, wherein the changing of the resolution is limited to a subset of permitted states.

18. The method of claim 1, wherein the hybrid state comprises any of a static image hybrid state and a video hybrid state, and wherein the video hybrid state comprises any of a live video hybrid state and a pre-recorded video hybrid state.

* * * * *